US008066626B2

(12) United States Patent
Hirakawa et al.

(10) Patent No.: US 8,066,626 B2
(45) Date of Patent: Nov. 29, 2011

(54) CONDUCTIVE RUBBER MEMBER

(75) Inventors: Naoki Hirakawa, Tokyo (JP); Asami Toki, Tokyo (JP)

(73) Assignee: Synztec Co., Ltd., Tokyo (JP)

( * ) Notice: Subject to any disclaimer, the term of this patent is extended or adjusted under 35 U.S.C. 154(b) by 560 days.

(21) Appl. No.: 12/239,911

(22) Filed: Sep. 29, 2008

(65) Prior Publication Data

US 2009/0087220 A1 Apr. 2, 2009

(30) Foreign Application Priority Data

Sep. 28, 2007 (JP) ................................ 2007-256132
Sep. 25, 2008 (JP) ................................ 2008-245512

(51) Int. Cl.
*F16C 13/00* (2006.01)

(52) U.S. Cl. ................. 492/56; 492/38; 492/28; 492/17

(58) Field of Classification Search .................... 492/17, 492/18, 28, 38, 49, 52, 53, 59, 60; 29/895.32, 29/895, 895.2, 895.21, 895.211; 399/286, 399/176, 279, 111, 119
See application file for complete search history.

(56) References Cited

U.S. PATENT DOCUMENTS

| | | | | |
|---|---|---|---|---|
| 4,661,529 A * | 4/1987 | Kuhn et al. | .................. | 521/137 |
| 6,534,180 B2 * | 3/2003 | Hoshi | .......................... | 428/413 |
| 7,638,196 B2 * | 12/2009 | Hirakawa et al. | ............. | 428/413 |
| 7,875,331 B2 * | 1/2011 | Hirakawa et al. | ............ | 428/36.8 |
| 2007/0104906 A1 | 5/2007 | Hirakawa et al. | | |
| 2007/0110936 A1 | 5/2007 | Hirakawa et al. | | |

FOREIGN PATENT DOCUMENTS

| | | |
|---|---|---|
| JP | 05-158341 | 6/1993 |
| JP | 2003-202722 | 7/2003 |
| JP | 3655364 | 3/2005 |
| JP | 2005-283913 | 10/2005 |
| JP | 2007-199694 | 8/2007 |

* cited by examiner

*Primary Examiner* — Sarang Afzali
(74) *Attorney, Agent, or Firm* — Young & Thompson

(57) ABSTRACT

The conductive rubber member of the invention has a conductive elastic layer to which conductivity has been imparted and which serves as an outermost layer, and a surface-treated layer formed through impregnating a surface of the conductive elastic layer with a surface-treatment liquid containing at least an isocyanate component and an organic solvent, wherein the surface-treated layer is formed of an upper portion on the outermost side, and a lower portion beneath the upper portion, the upper portion has a density of the isocyanate component which is greater on the inner side than on the surface side within the upper portion, and the lower portion has a density of the isocyanate component that gradually decreases inwardly.

7 Claims, 3 Drawing Sheets

CONDUCTIVE RUBBER MEMBER

The entire disclosure of Japanese Patent Applications Nos. 2007-256132 filed Sep. 28, 2007 and 2008-245512 filed Sep. 25, 2008 is expressly incorporated by reference herein.

BACKGROUND OF THE INVENTION

1. Field of the Invention

The present invention relates to a conductive rubber member particularly suitable for a conductive roller (e.g., a charge-imparting roller, an image-transfer roller, a development roller, a toner-supply roller, or a cleaning roller), a cleaning blade, a transfer belt, etc., for use in an image-forming apparatus such as an electrophotographic or toner-jet-type copying machine or printer.

2. Background Art

Conductive rubber rollers, which have rubber elasticity and controlled conductivity, are important members in an electrophotographic process. However, the molecule of the rubber for constituting a rubber roller generally does not have resistivity required for the process ($10^4$ to $10^9$ Ωcm), and such rubber roller employed in practice is formed from a limited rubber species such as epichlorohydrin rubber. In many cases, in order to ensure required levels of elastic modulus, mechanical strength, and temperature/moisture characteristics, electrical conductivity is imparted to a chemically stable rubber substrate such as silicone rubber, ethylene-propylene rubber (EPDM), or polyurethane through addition thereto of conductive microparticles such as carbon black, and a coating layer on the roller is formed in order to prevent staining of an organic photoconductor (OPC) and other members, adjust resistance of the roller, and prevent electrical, leakage.

In recent years, the melting point of a toner binder for use in an electrophotographic copying machine has become lower and lower. In response to this trend, a development roller is required to have low hardness so as to provide a sufficient deformation to ensure charging of the toner. Japanese Patent application Laid-Open (kokai) No. 2005-283913 discloses a development roller for satisfying the above requirement. The proposed roller, which includes an elastic layer, a urethane resin coating layer, and a thin layer formed of a hardened isocyanate, maintains softness over the entirety of the roller and has a hard surface.

Formation of a coating layer is not preferred, in that cumbersome steps are required, thereby increasing production cost. In an attempt to readily solve the problem, Japanese Patent application Laid-Open (kokai) No. 5-158341 discloses an approach including chemically treating a roller surface. Although the chemical treatment is an effective approach, a surface-treated conductive roller tends to have a hard surface. In practical use of a hardness-reduced roller, the surface of the roller is considerably deformed. Therefore, such a roller is required to have resilience in response to deformation. A roller having a hard surface-treated layer has insufficient resilience in response to deformation and may cause damage to an OPC or other members, and electrical resistance varies during use thereof, which are problematic.

Japanese Patent application Laid-Open (kokai) No. 2007-199694 discloses a conductive roller having a surface-treated layer and maintaining low hardness to a certain extent. However, the surface-treated layer is formed by use of, for example, a surface-treatment liquid which encounters difficulty in entering a conductive elastic layer, and the thus-formed layer is relatively thin. Therefore, the surface-treated layer exhibits insufficient performance in some uses, making the conductive roller unsatisfactory.

SUMMARY OF THE INVENTION

In view of the foregoing, an object of the present invention is to provide a conductive rubber member which does not cause staining of an OPC and other members and leakage, which has resilience in response to deformation, and which exhibits a small variation in electrical resistance.

In a first mode of the present invention for attaining the object, there is provided a conductive rubber member having a conductive elastic layer to which conductivity has been imparted and which serves as an outermost layer, and a surface-treated layer formed through impregnating a surface of the conductive elastic layer with a surface-treatment liquid containing at least an isocyanate component and an organic solvent, wherein the surface-treated layer is formed of an upper portion on the outermost side and a lower portion beneath the upper portion, the upper portion has a density of the isocyanate component which is greater on the inner side than on the surface side within the upper portion, and the lower portion has a density of the isocyanate component that gradually decreases inwardly.

A second mode of the invention is drawn to a specific embodiment of the conductive rubber member of the first mode, wherein the surface-treatment liquid further contains at least one element selected from the group consisting of carbon black, an acrylic fluoropolymer, and an acrylic silicone polymer.

A third mode of the invention is drawn to a specific embodiment of the conductive rubber member of the first or second mode, wherein the surface-treatment liquid further contains a polyether polymer.

A fourth mode of the invention is drawn to a specific embodiment of the conductive rubber member of the third mode, wherein the polyether polymer includes active hydrogen.

A fifth mode of the invention is drawn to a specific embodiment of the conductive rubber member of the fourth mode, wherein the polyether polymer is epichlorohydrin rubber.

A sixth mode of the invention is drawn to a specific embodiment of the conductive rubber member of any one of the first to the fifth modes, wherein the conductive elastic layer is imparted with conductivity by at least one of an electron-conductivity-imparting agent and an ion-conductivity-imparting agent.

A seventh mode of the invention is drawn to a specific embodiment of the conductive rubber member of any one of the first to the sixth modes, which has a roller shape or a blade shape.

According to the present invention, there can be provided a conductive rubber member which does not cause staining of an OPC and other members and leakage, which has resilience in response to deformation, and which exhibits a small variation in electrical resistance.

DETAILED DESCRIPTION OF PREFERRED EMBODIMENTS

The conductive rubber member according to the present invention, has a conductive elastic layer to which conductivity has been imparted, and a surface-treated layer formed through impregnating a surface of the conductive elastic layer with a surface-treatment liquid, wherein the surface-treated layer serving as a top surface of the conductive elastic layer is formed of an upper portion on the outermost side and a lower portion beneath the upper portion, the upper portion has a density of the isocyanate component which is greater on the inner side than on the surface side within the upper portion, and the lower portion has a density of the isocyanate component gradually decreases inwardly. By virtue of the characteristic feature, the lower portion of the surface-treated layer controls electrical resistance and prevents leakage and bleeding of contaminants from the core portion, similar to conventional cases, while the upper portion of the surface-treated layer (i.e., an upper layer with respect to the lower portion) prevents an increase in hardness of the outermost surface. As a result, the conductive rubber member has resilience in response to deformation and minimizes damage to a counter member such as an OPC. The present invention has been accomplished on the basis of this finding.

Figure 1:
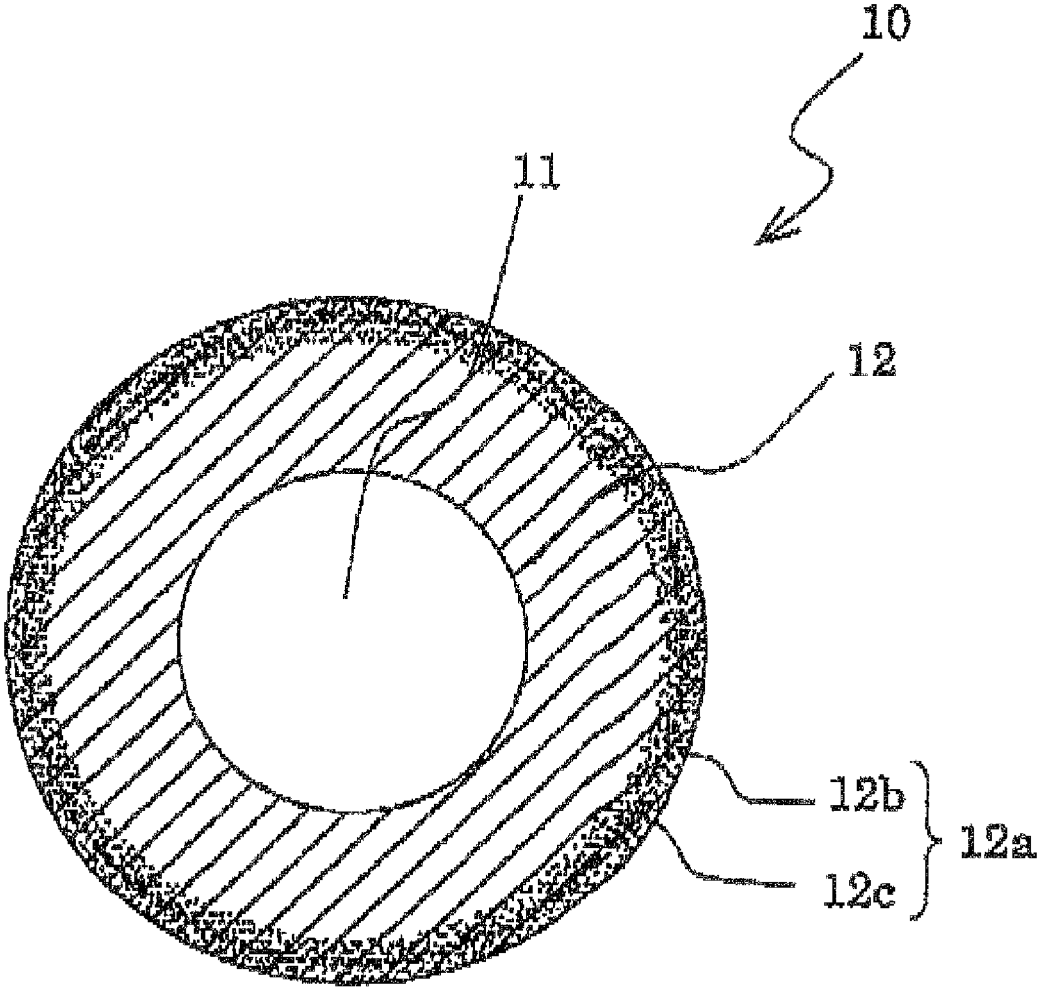
FIG. 1 is a cross-section of a conductive roller, which is an embodiment of the conductive rubber member of the present invention.

FIG. 1 is a cross-section of a conductive roller, which is an embodiment of the conductive rubber member of the present invention. As shown in FIG. 1, a conductive roller 10 has a core shaft 11 and a conductive elastic layer 12, which is formed through molding a rubber base containing a conductivity-imparting material and vulcanizing the rubber. The top layer of the elastic layer 12 is a surface-treated layer 12*a*, which is formed by use of a surface-treatment liquid containing an isocyanate component and an organic solvent. As used herein, the term "isocyanate component" collectively refers to isocyanate compounds, including polymers of an isocyanate compound, and may be denoted by simply "isocyanate." The surface-treated layer 12*a* is formed of an upper portion 12*b* on the uppermost layer side and a lower portion 12*c* beneath the upper portion. In the upper portion 12*b*, the density of impregnated isocyanate is greater on the inner side than on the surface side within the upper portion. For example, in the upper portion 12*b*, the density of the isocyanate component gradually increases inward from the top surface. In the lower portion 12*c*, the density of the isocyanate component gradually decreases inward from the top surface. When the presence of the upper portion 12*b* is referred to, it means that there is a region(s) where density of the isocyanate component is greater on the inner side than on the surface side within the upper portion. In other words, there is a region(s) where density of the isocyanate component decreases toward the top surface. Thus, absence of isocyanate is permitted at least at the top surface portion of the upper portion 12*b*. The interface between the upper portion 12*b* and the lower portion 12*c* is not necessarily clear, so long as the upper portion 12*b* provides a hardness which is lower at the proximity of the top surface than inner portion. The upper portion 12*b* is provided so as to realize a low hardness (i.e., lower than that of the lower portion 12*c*) at the outermost layer and, thus, has a thickness of 1 μm or more, preferably 10 μm or more. The upper portion 12*b* is particularly preferably provided at least to a depth such that the portion satisfactorily deforms during use. That is, for example, the thickness of the upper portion is particularly preferably about 10 to about 100 μm. The lower portion 12*c* preferably has a thickness of about 100 to about 1,000 μm. The thickness of the upper portion 12*b* or the lower portion 12*c* may be predicted through, for example, measuring the rubber hardness or electrical resistance of a site of the surface of the conductive rubber member, the surface being exposed by polishing.

The conductive roller 10 shown in FIG. 1 has a single elastic layer 12. However, so long as an elastic layer having the same structure as employed in the elastic layer 12 is present at the outermost layer, one or more other layers may be present thereunder. No particular limitation is imposed on the type of such layers, and the layers may be a sponge layer or a solid layer. That is, the present invention encompasses a conductive roller having a multi-layer structure.

The elastic layer 12 of the present invention employed in the conductive roller 10 is formed through molding a rubber base containing a conductivity-imparting material, and vulcanizing the rubber. Examples of the rubber base include polyurethane rubber, epichlorohydrin rubber, nitrile rubber (NBR), styrene rubber (SBR), and chloroprene rubber.

The conductivity-imparting agent may be an electron-conductivity-imparting agent such as carbon black or metallic powder, an ion-conductivity-imparting agent, or a mixture thereof. Examples of the ion-conductivity-imparting agent include an organic salt, an inorganic salt, a metal complex, and an ionic liquid. Examples of the organic salt and inorganic salt include lithium perchlorate, a quaternary ammonium salt, and sodium trifluoroacetate. Examples of the metal complex include ferric halide-ethylene glycol. A more specific example is a diethylene glycol-ferric chloride complex disclosed in Japanese Patent No. 3655364. Meanwhile, ionic liquid, which is also called ambient temperature molten salt, is a molten salt which is liquid at room temperature, having a melting point of 70° C. or lower, preferably 30° C. or lower. Specific examples of ionic liquid include species disclosed in Japanese Patent Application Laid-Open (kokai) No. 2003-202722.

No particular limitation is imposed on the method of producing the surface-treated layer 12*a*. For example, the surface-treated layer may be produced through impregnating the elastic layer 12 with a surface-treatment liquid and removing a part of the surface-treatment liquid held in the elastic layer 12. More specifically, as a first treatment, the elastic layer 12 is immersed in a first surface-treatment liquid containing an isocyanate component, or the first surface-treatment liquid is sprayed onto the elastic layer 12, to thereby cause the first surface-treatment liquid to permeate the elastic layer 12. Subsequently, as a second treatment, the thus-treated elastic layer 12 is immersed in an organic-solvent-based second surface-treatment liquid containing no isocyanate component or having an isocyanate concentration considerably lower than that of the first surface-treatment liquid, or washed with the second surface-treatment liquid, to thereby remove isocyanate present in the sub-surface portion. Finally, the thus-treated layer is dried and cured.

Such a two-step treatment may be performed sequentially or separately. However, after completion of the first treatment by use of the first surface-treatment liquid, the second treatment by use of the second surface-treatment liquid must be performed before curing the isocyanate component. In order to completely perform the second treatment of the entire surface of the elastic layer uniformly, the second treatment is preferably performed before evaporation of an organic solvent remaining on the surface of the elastic layer after the first treatment. More preferably, the second treatment is sequentially performed without exposure to air. When elastic layer is employed in a roller, the horizontal direction means a circumferential direction.

The sequential two-step treatment may be performed, for example, through the following procedure. In one procedure, an elastic layer is immersed in the first surface-treatment liquid and the second surface-treatment liquid is sprayed onto the elastic layer, while the elastic layer is pulled up. In another procedure, a so-called separated phase method, a first surface-treatment liquid and a second surface-treatment liquid, which can be separated from each other, are employed, and the elastic layer immersed in the first surface-treatment liquid is moved to the second surface-treatment liquid. In one embodiment of the separated phase method, the elastic layer remains immersed in the first surface-treatment liquid; a second surface-treatment liquid is poured on the first surface-treatment liquid to form a layer; and the elastic layer is pulled up for passage through the second surface-treatment liquid.

In the case where the two-step treatment is performed in a separate manner, in order to completely perform the second surface treatment of the entire surface of the elastic layer uniformly, preferably, the second treatment is performed before evaporation of an organic solvent remaining on the surface of the elastic layer, or at the timing when a part of the organic solvent has been evaporated from the entire surface of the layer virtually uniformly. Through this procedure, unevenness in the degree of evaporation of organic solvent at the elastic layer surface, which would otherwise cause failure of uniform treatment, is prevented.

The first surface-treatment liquid is based on an organic solvent in which at least an isocyanate component has been dissolved.

Examples of the isocyanate component contained in the first surface-treatment liquid include isocyanate compounds such as 2,6-tolylene diisocyanate (TDI), 4,4'-diphenylmethane diisocyanate (MDI), p-phenylene diisocyanate (PPDI), 1,5-naphthalene diisocyanate (NDI) 3,3-dimethyldiphenyl-4,4'-diisocyanate (TODI), and modified products and oligomers thereof. A prepolymer formed from a polyol and an isocyanate may also be employed.

No particular limitation is imposed on the organic solvent employed in the first surface-treatment liquid, so long as the solvent can dissolve the isocyanate component and the below-mentioned optional components (polyether polymer, acrylic fluoropolymer, and acrylic silicone polymer). Preferably, an organic solvent with which the elastic layer 12 is readily impregnated and which swells the elastic layer 12 is employed. Although the type of the solvent varies depending on the type of rubber base, organic solvents such as ethyl acetate, methyl ethyl ketone (MEK), methyl isobutyl ketone (MIBK), and toluene may be used. In the case of the separated-phase method, the first surface-treatment liquid may be polar aprotic solvent, which separates from a non-polar solvent (e.g., hexane). Although the type of the liquid varies depending on the type of the second surface-treatment liquid, examples of the first treatment liquid include such organic solvents such as N-methylpyrrolidone, N,N-dimethylformamide (DMF), dimethyl sulfoxide (DMSO), and acetonitrile.

The first surface-treatment liquid may further contain polyether polymer. The polyether polymer is preferably soluble in organic solvent and includes active hydrogen, which reacts with an isocyanate to form a chemical bond.

A preferred polyether polymer containing active hydrogen is, for example, epichlorohydrin rubber. The epichlorohydrin rubber used herein refers to unvulcanized epichlorohydrin rubber. Epichlorohydrin rubber is preferably used, since it can impart conductivity and elasticity to the surface-treated layer. Notably, epichlorohydrin rubber per se has active hydrogen (hydroxyl group) at one end. Epichlorohydrin rubber having in a repeating unit active hydrogen such as a hydroxyl group or an allyl group is also preferred. Examples of the epichlorohydrin rubber include epichlorohydrin homopolymer, epichlorohydrin-ethylene oxide copolymer, epichlorohydrin-ally glycidyl ether copolymer, epichlorohydrin-ethylene oxide-allyl glycidyl ether terpolymer, and derivatives thereof.

Examples of other suitable polyether polymers including active hydrogen include those having a hydroxyl group or an allyl group. Specific examples include polyols and glycols. Such polyether polymers preferably include active hydrogen at one end rather than at both ends. The polyether polymer preferably has a number average molecular weight of 300 to 1,000, from the viewpoint of imparting elasticity to the surface-treated layer. Examples of such polyether polymers include polyalkylene glycol monomethyl ether, polyalkylene glycol dimethyl ether, allylated polyether, polyalkylene glycol diol, and polyalkylene glycol triol.

Through incorporation of polyether polymer into the surface-treatment liquid, the surface-treated layer formed therefrom has improves softness and strength. As a result, wearing of the surface of the conductive rubber member and damage of the surface of a counter photoreceptor can be prevented.

The first surface-treatment liquid may further contain a polymer selected from among an acrylic fluoropolymer and an acrylic silicone polymer.

The acrylic fluoropolymer and acrylic silicone polymer employed in the first surface-treatment liquid can be dissolved in a specific solvent and can be reacted with isocyanate to form a chemical bond. The acrylic fluoropolymer is a fluorine-containing polymer which has, for example, a hydroxyl group, an alkyl group, or a carboxyl group, and can be dissolved in a solvent. Examples include a block copolymer of an acrylic acid ester and a fluoroalkyl acrylate, and derivatives thereof. The acrylic silicone polymer is a silicone-base polymer which is soluble in a solvent. Examples include a block copolymer of an acrylic acid ester and a siloxane acrylate, and derivatives thereof.

The first surface-treatment liquid may further contain, as a conductivity-imparting material, carbon black such as Acetylene Black, Ketjen Black, or Toka Black.

The amount of carbon black employed in the first surface-treatment liquid is preferably 0 to 40% by mass with respect to isocyanate. When the amount of carbon black is excessively large, problems such as removal of carbon black from the rubber member, deterioration of physical properties, etc. occur, which is not preferred.

The amounts of the acrylic fluoropolymer and acrylic silicone polymer employed in the first surface-treatment liquid are preferably such that the total amount of the polymers is adjusted to 2 to 30 parts by mass with respect to 100 parts by mass of isocyanate. When the total amount is less than 2 parts by mass, the surface-treated layer has poor performance to retain additives such as carbon black, whereas when the polymer amount is excessively large, the electrical resistance of a charge-imparting roller increases, thereby impairing electric discharge characteristics, and the relative isocyanate amount decreases, thereby failing to form an effective surface-treated layer, which are problematic.

No particular limitation is imposed on the second surface-treatment liquid, so long as the liquid is based on an organic solvent and can remove isocyanate present the sub-surface portion which isocyanate has permeated the elastic layer 12. Preferably, the second surface-treatment liquid contains no isocyanate. When isocyanate is contained, preferably, the isocyanate concentration is much smaller than that of the first surface-treatment liquid.

Similar to the solvent employed in the first surface-treatment liquid, the organic solvent which can be employed in the second surface-treatment liquid may be a solvent which can dissolve isocyanate. However, for an operational reason, preferred is an organic solvent which does not dissolve isocyanate or an organic solvent which hardly swells the elastic layer, as compared with the organic solvent employed in the first surface-treatment liquid. When an organic solvent which dissolves isocyanate or an organic solvent which swells the elastic layer, to an extent equivalent to or higher than that attained by the organic solvent employed in the first surface-treatment liquid, is employed, not only isocyanate in the top sub-surface layer but also isocyanate which is contained in the lower portion of the elastic layer which prevents staining of the roller surface are possibly removed. Use of such a solvent requires precise control of temperature and time in the operation, which is not advantageous.

The organic solvent which is suitably employed in the second surface-treatment liquid used in the aforementioned separated phase method is a non-polar solvent, which is a poor solvent to isocyanate, and examples include hexane and cyclohexane. Such a solvent is advantageous, since the upper portion can be formed uniformly with a small thickness.

On the other hand, when a two-step treatment other than the separated phase method is performed, a polar solvent, which is a good solvent to isocyanate may be employed as a second surface-treatment liquid. Similar to the organic solvent of the first surface-treatment liquid, ethyl acetate, methyl ethyl ketone (MEK), butyl acetate, and N-methylpyrrolidone may be employed. When surface treatment is performed by use of such a solvent, the formed upper portion has a large thickness. The thicker the upper portion, the lower the hardness of a roller surface.

No particular limitation is imposed on the method of drying and curing, so long as the method can harden isocyanate in the elastic layer. In one possible method, an uncured body is cooled to a temperature lower than the solidifying point of the isocyanate, followed by curing by water contained in the atmosphere. In another method, the remaining solvent is evaporated under reduced pressure, followed by curing by heat or by water. Generally, optional heat treatment is performed immediately after completion of drying at ambient temperature. The heating temperature is, for example, 40 to 150° C.

The thickness of each of the upper portion 12*b* and the lower portion 12*c* is appropriately controlled in accordance with the conditions such as the type of organic solvent used, the amount of surface-treatment liquid with which the layer impregnated, the concentration of the first surface-treatment liquid, and the isocyanate curing temperature.

In the present invention, the surface-treated layer 12*a* formed in the surface portion of the elastic layer 12 is formed of the upper portion 12*b* and the lower portion 12*c*, as mentioned above. The upper and lower portions integrally forms the surface portion of the elastic layer 12. In the surface-treated layer 12*a*, the lower portion 12*c*, in particular, is formed integrally with the upper portion through curing the isocyanate component such that the density of the isocyanate component of the lower portion gradually decreases inwardly from the top surface to the bottom. Therefore, bleeding of contaminants such as a plasticizer to the surface of a conductive roller can be prevented, whereby a conductive roller which has high staining-prevention performance to a photoreceptor can be provided. By virtue of the presence of the upper portion 12*a*, the hardness of the top surface can be maintained at a low level, thereby providing sufficient resilience in response to deformation.

The conductive rubber member according to the present invention is useful for a conductive roller (e.g., a charge-imparting roller, an image-transfer roller, a development roller, a toner-supply roller, or a cleaning roller), a cleaning blade, a transfer belt, etc., for use in an image-forming apparatus such as an electrophotographic or toner-jet-type copying machine or printer.

EXAMPLES

The present invention will next be described in detail by way of examples, which should not be construed as limiting the invention thereto. Unless otherwise specified, the unit "part(s)" employed in the Examples, Comparative Examples, and Test Examples refers to "part(s) by mass."

Example 1

<Production of Roller>

Ketjen Black EC (product of Ketjen Black International) (3 parts) and Asahi #60 (product of Asahi Carbon) (5 parts) were added to 3-functional polyether polyol (M-3050, product of Mitsui Takeda Chemical) (100 parts), and carbon particles were dispersed to a particle size of about 20 μm or less, followed by maintaining at 80° C., and defoaming and dehydrating for 6 hours under reduced pressure, to thereby prepare liquid A. Separately, Coronate C-HX (product of Nippon Polyurethane Industry Co., Ltd.) (10 parts) was added to a prepolymer (Adiprene L100, product of Uniroyal) (22 parts), and the mixture was maintained at 800° C. to thereby prepare liquid B. Liquids A and B were mixed, and the mixture was poured into a metal mold (iron pipe, ϕ: 23 mm) in which a shaft (ϕ: 8 mm, 1: 270 mm) had been inserted along the center axis and which had been heated at 120° C. The mixture was molded at 120° C. for 120 minutes, to thereby produce a roller having a conductive polyurethane layer on a shaft surface (except both ends of the shaft). The surface of the roller was polished by 1.5 mm, to thereby prepare a roller (before surface treatment) having an outer diameter of 20 mm.

<Preparation of Surface-Treatment Liquid>

A prepolymer (Adiprene L100, product of Uniroyal) (10 parts) was added to acetonitrile (100 parts), followed by mixing for dissolution, to thereby prepare a surface-treatment liquid.

<Surface Treatment of Roller>

While the surface-treatment liquid was maintained at 23° C., the above-produced roller was immersed in the liquid for 60 seconds. After immersion, cyclohexane (100 parts) was gently added to the surface-treatment liquid, to thereby form separated phases, and the roller was drawn up at 250 mm/min. The roller was heated for one hour in an oven maintained at 120° C., to thereby form a surface-treated layer.

Example 2

<Production of Roller>

Epichlorohydrin rubber (Epichlomer CG-102, product of Daiso Co., Ltd.) (100 parts), tetraethylammonium perchlorate (Kanto Chemical Co., Inc.) (0.5 parts) serving as a conducting agent, di(2-ethylhexyl) phthalate (DOP) (3 parts) serving as a plasticizer, zinc oxide (ZnO) (5 parts), and 2-mercaptoimidazoline (Accel-22) (2 parts) serving as a vulcanizer were kneaded by means of a roll mixer, and the kneaded product was press-formed on the surface of a metallic shaft (ϕ: 6 mm), to thereby form a roller having an epichlorohydrin rubber layer on the shaft surface. The outer surface of the thus-coated shaft was polished, to thereby produce a roller (before 12 mm) having an outer diameter of 12 mm.

<Preparation of Surface-Treatment Liquid>

An isocyanate compound (HDI) (20 parts) was added to methyl isobutyl ketone (100 parts), followed by mixing for dissolution, to thereby prepare a surface-treatment liquid.

<Surface Treatment of Roller>

While the surface-treatment liquid was maintained at 23° C., the above-produced roller was immersed in the liquid for 30 seconds. After immersion, the roller was drawn up at 250 mm/min, and the rubber layer was uniformly semi-dried. The semi-dried roller was immersed for 10 seconds in butyl acetate maintained at 23° C. and pulled up again. The roller was heated for one hour in an oven maintained at 120° C., to thereby form a surface-treated layer.

Example 3

The procedure of Example 1 was repeated, except that the roller was surface-treated in an oven at 150° C., to thereby produce a conductive roller of Example 3.

Example 4

The procedure of Example 1 was repeated, except that acetylene black (5 parts) was added to the surface-treatment liquid, to thereby produce a conductive roller of Example 4.

Comparative Example 1

The procedure of Example 1 was repeated, except that cyclohexane was not added, to thereby produce a conductive roller of Comparative Example 1.

Comparative Example 2

The procedure of Example 1 was repeated, except that cyclohexane was not added after immersion in the surface-treatment liquid, and that the surface of the drawn roller was wiped with a cyclohexane-absorbed sponge, to thereby produce a conductive roller of Comparative Example 2.

Comparative Example 3

The procedure of Example 2 was repeated, except that immersion in butyl acetate was not performed, to thereby produce a conductive roller of Comparative Example 3.

Comparative Example 4

The procedure of Example 2 was repeated, except that a roller was immersed in the surface-treatment liquid and, sequentially, for 30 seconds in methy isobutyl ketone maintained at 23° C., to thereby produce a conductive roller of Comparative Example 4.

Comparative Example 5

The procedure of Example 2 was repeated, except that a coating layer was formed through applying an urethane coating (NeoRez R-940, product of Kusumoto Chemicals, Ltd.) onto the surface of the rubber roller, and that the coated roller was sequentially immersed for 10 seconds in butyl acetate maintained at 23° C., followed by heating for one hour in an oven maintained at 120° C., to thereby produce a conductive roller of Comparative Example 5.

Test Example 1

Measurement of Micro-Hardness of Roller

Rubber hardness (Hs) of each of the untreated conductive rollers and the conductive rollers of the Examples and the Comparative Examples was determined by means of a micro-hardness tester (MD-1, product of Koubunshi Keiki Co., Ltd.) The results are shown in Tables 1 and 2.

Test Example 2

Measurement of Electrical Resistance of Roller

The electrical resistance of each of the untreated conductive rollers and conductive rollers produced in the Examples and Comparative Examples was measured under application a voltage of 100 V. Electrical resistance was measured in the following manner. Specifically, each conductive roller was placed on an electrode member formed of a SUS 304 plate, and a load of 500 g was applied to each end of the roller. In this state, electrical resistance between the metal shaft and the electrode member after voltage application for 30 seconds was measured by means of ULTRA HIGH RESISTANCE METER R8340A (product of Advantest) under normal temperature-normal humidity conditions (NN: 23° C., 55% RH). Electrical resistance was measured at eight positions along the circumferential direction by rotating the roller with a unit rotation angle of 45°, and the maximum, minimum, and average values were determined. The results are shown in Tables 1 and 2.

Test Example 3

Observation of Surface State

The surface state of each of the conductive rollers produced in the Examples and Comparative Examples was visually observed. The surface state was evaluated by the following ratings good (○), fair (Δ), and bad (×). The results are shown in Tables 1 and 2.

Test Example 4

Image Evaluation

Each of the conductive rollers produced in Example 1 and Comparative Examples 1 and 2 and serving as development rollers, and each of the conductive rollers produced in Example 2 and Comparative Examples 3 to 5 and serving as charge-imparting rollers were installed in a commercial laser printer (MICROLINE 9600PS, product of Oki Data). An image was output by operating the printer under the conditions of 23° C. and 55% RH (NN), and the quality of the output images after passage of 10,000 sheets was visually evaluated in terms of the following ratings; excellent (○), fair (Δ), and bad (×). The surface state of the roller was also visually observed. The results are also shown in Tables 1 and 2.

Test Example 5

Evaluation of Re-Polished Roller

The rubber surface of each of the conductive rollers produced in the Examples and Comparative Examples was re-polished to depths of 0.05 mm, 0.1 mm, and 0.3 mm. At each polishing depth, rubber hardness (Hs) was measured in a manner similar to that of Test Example 1, and electrical resistance was measured in a manner similar to that of Test Example 2. The results are shown in Tables 3 and 4 and FIGS. 2 to 5.

TABLE 1

| | Urethane substrate | Ex. 1 | Ex. 3 | Ex. 4 | Comp. Ex. 1 | Comp. Ex. 2 |
|---|---|---|---|---|---|---|
| Micro-hardness (°) | 52.0 | 53.7 | 53.0 | 55.4 | 57.3 | 55.9 |
| Electrical resistance (Ω) | 7.24 × $10^6$ | 7.11 × $10^7$ | 5.52 × $10^7$ | 1.12 × $10^8$ | 2.39 × $10^8$ | 1.20 × $10^8$ |
| Electrical resistance (MAX/MIN ratio) | 5 | 4 | 4 | 4 | 4 | 112 |
| Surface state | — | ○ good | ○ good | ○ good | ○ good | X uneven treatment |
| Image evaluation | — | ○ good | ○ good | ○ good | X crack roller surface | X uneven color density |

TABLE 2

| | Epichlo substrate | Ex. 2 | Comp. Ex. 3 | Comp. Ex. 4 | Comp. Ex. 5 |
|---|---|---|---|---|---|
| Micro-hardness (°) | 46.2 | 48.2 | 52.4 | 46.7 | 54.2 |
| Electrical resistance (Ω) | 5.94 × $10^5$ | 8.00 × $10^5$ | 1.64 × $10^6$ | 6.97 × $10^5$ | 9.30 × $10^6$ |
| Electrical resistance (MAX/MIN ratio) | 5 | 3 | 4 | 34 | 12 |
| Surface state | — | ○ good | ○ good | Δ uneven treatment | Δ uneven treatment |
| Image evaluation | — | ○ good | X crack roller surface & photo-receptor damage | Δ Uneven color density | X cracks on roller surface |

TABLE 3

| | Polish depth (mm) | Ex. 1 | Ex. 3 | Ex. 4 | Comp. Ex. 1 | Comp. Ex. 2 |
|---|---|---|---|---|---|---|
| Micro-hardness (°) | 0 | 53.7 | 53.4 | 53.6 | 57.3 | 55.9 |
| | 0.05 | 54.3 | 54.2 | 54.1 | 56.5 | 56.1 |
| | 0.10 | 54.5 | 54.4 | 54.3 | 56.0 | 55.8 |
| | 0.30 | 53.9 | 53.9 | 53.9 | 54.2 | 54.1 |
| Electrical resistance (Ω) | 0 | 7.11 × $10^7$ | 4.52 × $10^7$ | 3.10 × $10^7$ | 2.39 × $10^8$ | 1.20 × $10^8$ |
| | 0.05 | 9.77 × $10^7$ | 1.21 × $10^8$ | 7.97 × $10^7$ | 2.10 × $10^8$ | 1.44 × $10^8$ |
| | 0.10 | 7.85 × $10^7$ | 8.90 × $10^7$ | 6.85 × $10^7$ | 1.54 × $10^8$ | 9.93 × $10^7$ |
| | 0.30 | 1.23 × $10^7$ | 1.30 × $10^7$ | 1.45 × $10^7$ | 1.54 × $10^7$ | 1.41 × $10^7$ |

TABLE 4

| | Polish depth (mm) | Ex. 2 | Comp. Ex. 3 | Comp. Ex. 4 | Comp. Ex. 5 |
|---|---|---|---|---|---|
| Micro-hardness (°) | 0 | 48.2 | 52.4 | 46.7 | 54.2 |
| | 0.05 | 48.4 | 49.7 | 47.1 | 46.9 |
| | 0.10 | 47.1 | 48.8 | 47.9 | 46.3 |
| | 0.30 | 46.8 | 47.2 | 46.7 | 46.5 |
| Electrical resistance (Ω) | 0 | 8.00 × $10^5$ | 1.64 × $10^6$ | 6.97 × $10^5$ | 9.30 × $10^6$ |
| | 0.05 | 8.43 × $10^5$ | 1.32 × $10^6$ | 7.13 × $10^5$ | 6.13 × $10^5$ |
| | 0.10 | 7.72 × $10^5$ | 9.68 × $10^5$ | 7.19 × $10^5$ | 5.96 × $10^5$ |
| | 0.30 | 7.32 × $10^5$ | 7.53 × $10^5$ | 6.85 × $10^5$ | 5.91 × $10^5$ |

Results

The conductive rollers of Examples 1, 3, and 4, which had been surface-treated with a phase-separated surface-treatment liquid system, were found to exhibit a micro-hardness and an electrical resistance lower than those of the conductive roller of Comparative Example 1, produced through a conventional surface treatment. The conductive roller of Example 2, which had been surface-treated through two separate steps, was found to exhibit a micro-hardness and an electrical resistance lower than those of the conductive roller of Comparative Example 3, produced through a conventional surface treatment. The quality of the printed images obtained with the rollers of Examples 1 to 4 after passage of 10,000 sheets was good.

In contrast, the surface of the conductive roller of Comparative Example 1, produced through a conventional surface treatment, became crack after passage of 10,000 sheets. The conductive roller of Comparative Example 3 caused damage to the surface of a phororeceptor. The quality of the printed images obtained with both comparative rollers was bad.

The conductive roller of Comparative Example 2, produced through immersion of a roller in the surface-treatment liquid and wiping the roller surface with a cyclohexane-absorbed sponge, exhibited a micro-hardness and an electrical resistance which were lower than those of the conductive roller of Comparative Example 1. The electrical resistance of the conductive roller of Comparative Example 2 considerably varied depending on the measurement site. In image evaluation, unevenness of color density was observed in printed images, which was rated bad. The conductive roller of Comparative Example 4, produced through immersion of a roller in the surface-treatment liquid and further immersion in methyl isobutyl ketone for 30 seconds, exhibited a micro-hardness and an electrical resistance which were lower than those of the conductive roller of Example 2. However, since a roller in a non-uniform semi-dried state (i.e., a part of the roller remained wet) was immersed in a solvent, the roller surface exhibited unevenness in treatment, resulting in slight unevenness in electrical resistance. In image evaluation, unevenness of color density was observed in printed images. Furthermore, since the roller was immersed in methyl isobutyl ketone, which is a good solvent, the density of the isocyanate component of the surface-treated layer was thought to decrease excessively. In fact, an OPC was stained by a plasticizer. Therefore, the conductive rollers of Comparative Examples 2 and 4 were found to have a non-uniform structure, although the surface-treated layers partly had a structure in which the upper portion has a density of the isocyanate component which is greater on the inner side than on the surface side within the upper portion.

The conductive roller of Comparative Example 5, produced through application of a coating liquid to a roller and further immersion in butyl acetate for 10 seconds was found to have an unevenly treated surface, resulting in slight unevenness in electrical resistance, since a roller in a semi-dried state was immersed in a solvent, similar to the conductive roller of Comparative Example 4. In image evaluation, bad printed images were obtained due to cracks generated on the surface of the roller.

The conductive rollers of the Examples and Comparative Examples were re-polished, and the polished surfaces were evaluated on the basis of physical properties. As shown in FIGS. 2 to 5, the conductive rollers of Examples 1 to 4 each was found to have a region in which the rubber hardness increased inward from the top surface and decreased in the lower layer beneath the upper region. Thus, as mentioned above, in each roller, the surface-treated layer was found to be formed of an upper portion and a lower portion.

Figure 2:
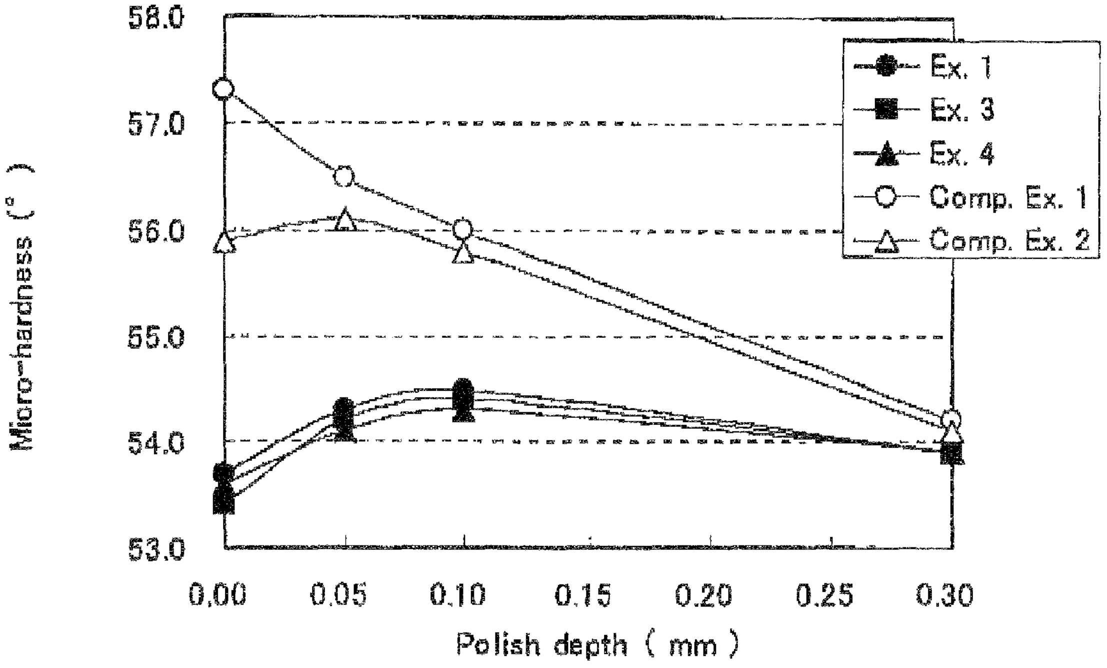
FIGS. 2 to 5 are graphs each showing the results of Test Example 5.
Figure 3:
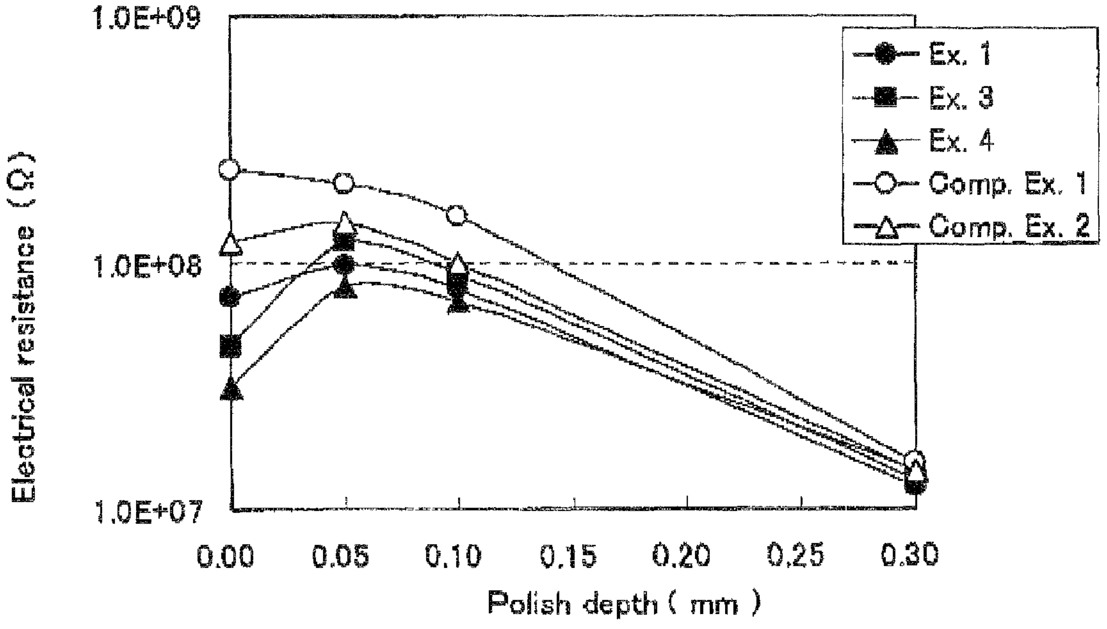
Figure 4:
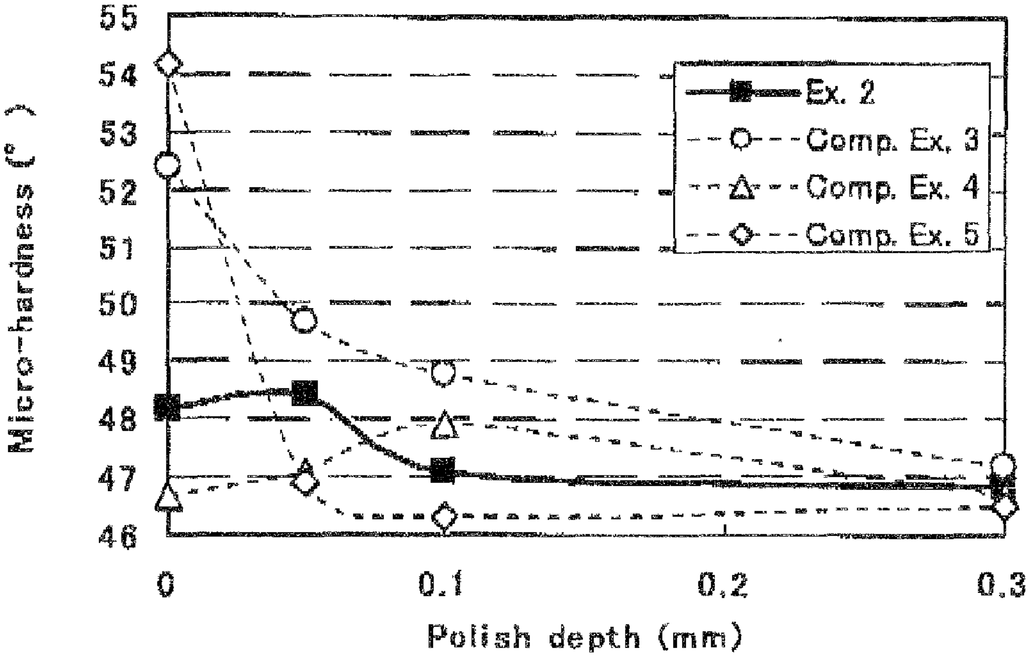
Figure 5:
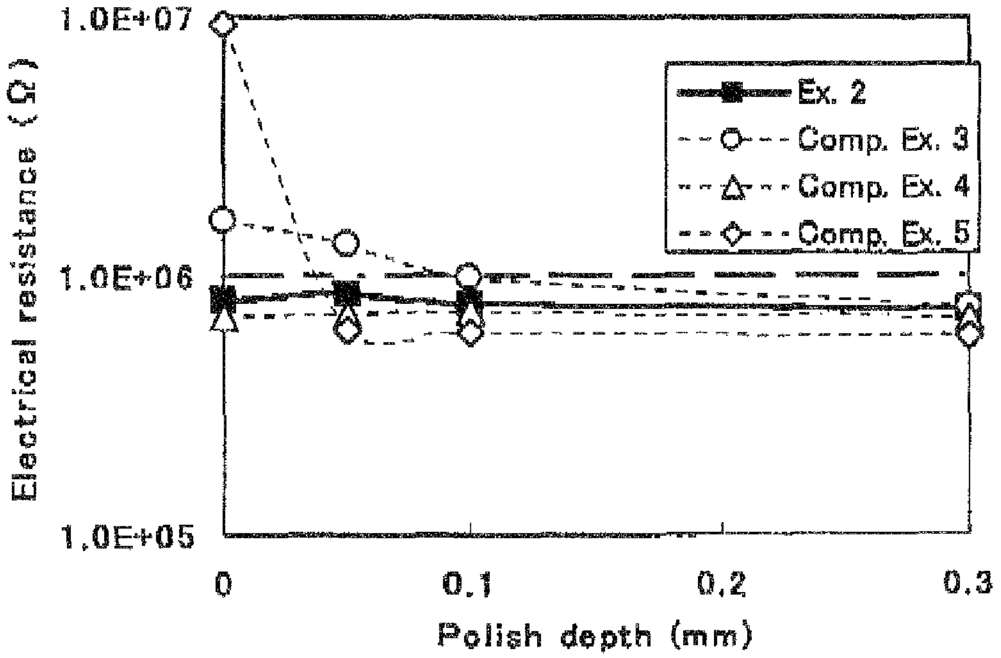

As shown in FIGS. 2 and 3, the conductive rollers of Examples 1 and 4 each had a rubber hardness profile in which the hardness gradually increased from the top to a depth of about 0.1 mm, and then gradually decreased. Further more, the conductive rollers of Examples 1 and 4 were found to have a resistance-gradient layer in which the electrical resistance gradually increased from the top to a depth of about 0.05 mm and then decreased. Similarly, in the roller of Example 2, the rubber hardness and electrical resistance increased from the top to a predetermine depth and then decreased.

Since the conductive roller of Example 3 was produced at an elevated treatment temperature, conceivably, the substrate swelled and isocyanate diffuses to a deeper level. In fact, the electrical resistance was found to drastically increase from the top to a depth of about 0.05 mm.

The conductive rollers of Comparative Examples 1 and 3, produced through a conventional surface treatment, was found to have a resistance-gradient layer in which the rubber hardness and electrical resistance gradually decreased inward from the top surface.

In region of the conductive roller of Comparative Example 4, from the top to a depth of about 0.1 mm, the rubber hardness and electrical resistance were found to gradually increase.

When the conductive roller of Comparative Example 5 was polished to a depth of 0.05 mm from the top surface, the exposed surface exhibited almost the same electrical resistance and rubber hardness as those of the rubber substrate. Therefore, the surface of the conductive roller of Comparative Example 5 was found to be formed of a coating layer.

What is claimed is:

1. A conductive rubber member, comprising:

a conductive elastic layer to which conductivity has been imparted and which serves as an outermost layer; and a surface-treated layer formed through impregnating a surface of the conductive elastic layer with a surface treatment liquid containing at least an isocyanate component and an organic solvent, wherein the surface-treated layer is formed of an upper portion on an outermost side of the surface-treated layer and a lower portion beneath the upper portion, the upper portion has a density of the isocyanate component which is greater on an inner side of the upper portion than on an outside surface side of the upper portion, and the lower portion has a density of the isocyanate component that gradually decreases inwardly.

2. The conductive rubber member according to claim 1, wherein the surface-treatment liquid further comprises a polyether polymer.

3. The conductive rubber member according to claim 2, wherein the polyether polymer comprises active hydrogen.

4. The conductive rubber member according to claim 3, wherein the polyether polymer is epichlorohydrin rubber.

5. The conductive rubber member according to claim 1, wherein the surface-treatment liquid further comprises at least one element selected from the group consisting of: carbon black, an acrylic fluoropolymer, and an acrylic silicone polymer.

6. The conductive rubber member according to claim 1, wherein the conductive elastic layer is imparted with conductivity by at least one of an electron-conductivity-imparting agent and an ion-conductivity-imparting agent.

7. The conductive rubber member according to claim 1, which has a roller shape or a blade shape.

* * * * *